US012710962B2

(12) United States Patent
Blasco

(10) Patent No.: US 12,710,962 B2
(45) Date of Patent: Aug. 18, 2026

(54) PERFORMING MEMORY DEPENDENCY IDENTIFICATION WITHOUT PREVIOUSLY ENCOUNTERED READ-AFTER-WRITE (RAW) HAZARDS IN PROCESSOR DEVICES

(71) Applicant: QUALCOMM Incorporated, San Diego, CA (US)

(72) Inventor: Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/826,409

(22) Filed: Sep. 6, 2024

(65) Prior Publication Data

US 2026/0072692 A1 Mar. 12, 2026

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01); *G06F 9/30079* (2013.01)

(58) Field of Classification Search
CPC .. G06F 9/30043; G06F 9/3834; G06F 9/3836; G06F 9/3838
See application file for complete search history.

(56) References Cited

U.S. PATENT DOCUMENTS 7,600,097 B1 * 10/2009 Wright ................ G06F 9/30167 712/216
8,918,625 B1 * 12/2014 O'Bleness ............ G06F 9/3842 712/216
10,437,595 B1 * 10/2019 Kanapathipillai .... G06F 9/3838
10,838,729 B1 * 11/2020 Al-Otoom ............... G06F 9/384
2011/0276791 A1 11/2011 Chaudhry et al.
2015/0160945 A1 6/2015 Ashcraft et al.

(Continued)

OTHER PUBLICATIONS

Jin Z., et al., "Dynamic Memory Dependence Predication", 2018 ACM/IEEE 45th Annual International Symposium on Computer Architecture, Jun. 1-6, 2018, pp. 235-246.

(Continued)

*Primary Examiner* — Jyoti Mehta
*Assistant Examiner* — Emilio Alcantara-Ramos
(74) *Attorney, Agent, or Firm* — W&T

(57) ABSTRACT

Performing "cold" memory dependency identification in processor devices is disclosed herein. In some aspects, a processor device includes a dependency identifier circuit comprising a store instruction queue. The dependency identifier circuit detects a store instruction comprising a single store address register number and a store immediate value in an instruction processing circuit front end. The dependency identifier circuit writes a store physical register number, the store immediate value, and an age indicator in an entry of the store instruction queue. The dependency identifier circuit detects a load instruction comprising a single load address register number and a load immediate value in the instruction processing circuit front end. The dependency identifier circuit determines whether an entry of the store instruction queue stores a corresponding load physical register number and the load immediate value, and, if so, establishes a dependency between the load instruction and a store instruction corresponding to the entry.

19 Claims, 8 Drawing Sheets

(56) References Cited

U.S. PATENT DOCUMENTS

| | | | | |
|---|---|---|---|---|
| 2015/0309792 | A1 | 10/2015 | Meier et al. | |
| 2016/0117174 | A1* | 4/2016 | Chadha | G06F 9/3838 712/206 |
| 2017/0351522 | A1* | 12/2017 | Ayub | G06F 9/3834 |
| 2019/0114174 | A1 | 4/2019 | Zeng | |
| 2022/0398100 | A1* | 12/2022 | Tekmen | G06F 9/3802 |

OTHER PUBLICATIONS

Kim S.S., et al., "Effective Context-Sensitive Memory Dependence Prediction", 2024 IEEE International Symposium on High-Performance Computer Architecture (HPCA), Mar. 2-6, 2024, 13 Pages.

International Search Report and Written Opinion for International Patent Application No. PCT/US2025/044453, mailed Dec. 23, 2025, 16 pages.

* cited by examiner

INSTRUCTION STREAM 300

```
                304   306
302 STR X0,[X1,#32]    // Store value from register X0 to address resulting from adding
                          immediate value 32 to the contents of register X1
  ⋮
308 LDR X18,[X1,#32]   // Load value from address resulting from adding immediate value
                          32 to the contents of register X1 (same address as above,
                          assuming that contents of X1 are unchanged
                 310   312
```

FIG. 3

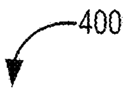

402

DETECT, BY A DEPENDENCY IDENTIFIER CIRCUIT (146) OF A PROCESSOR DEVICE (102), A SINGLE STORE INSTRUCTION (302) IN A FRONT END (106) OF AN INSTRUCTION PROCESSING CIRCUIT (104) OF THE PROCESSOR DEVICE (102), WHEREIN THE STORE INSTRUCTION (302) COMPRISES A STORE ADDRESS REGISTER NUMBER (304) MAPPED TO A STORE PHYSICAL REGISTER NUMBER (130(0)), AND A STORE IMMEDIATE VALUE (306)

404

WRITE, BY THE DEPENDENCY IDENTIFIER CIRCUIT (146), THE STORE PHYSICAL REGISTER NUMBER (130(0)), THE STORE IMMEDIATE VALUE (306), AND AN AGE INDICATOR (204(0)) IN AN ENTRY (150(0)) OF A PLURALITY OF ENTRIES (150(0)-150(E)) OF A STORE INSTRUCTION QUEUE (148)

406

SUBSEQUENTLY DETECT, BY THE DEPENDENCY IDENTIFIER CIRCUIT (146), A LOAD INSTRUCTION (308) IN THE FRONT END (106) OF THE INSTRUCTION PROCESSING CIRCUIT (104), WHEREIN THE LOAD INSTRUCTION (308) COMPRISES A SINGLE LOAD ADDRESS REGISTER NUMBER (310) MAPPED TO A LOAD PHYSICAL REGISTER NUMBER (130(0)), AND A LOAD IMMEDIATE VALUE (312)

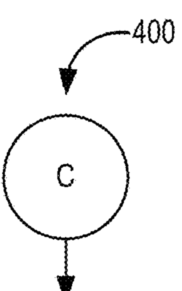

416
DETERMINE, BY THE DEPENDENCY IDENTIFIER CIRCUIT (146), THAT EXECUTION OF THE STORE INSTRUCTION (302) HAS BEEN INITIATED BY THE INSTRUCTION PROCESSING CIRCUIT (104)

418
RESPONSIVE TO DETERMINING THAT EXECUTION OF THE STORE INSTRUCTION (302) HAS BEEN INITIATED, INVALIDATE, BY THE DEPENDENCY IDENTIFIER CIRCUIT (146), THE ENTRY (150(0)) OF THE STORE INSTRUCTION QUEUE (148) CORRESPONDING TO THE STORE INSTRUCTION (302)

420
DETERMINE, BY THE DEPENDENCY IDENTIFIER CIRCUIT (146), THAT A PIPELINE FLUSH HAS BEEN INITIATED BY THE INSTRUCTION PROCESSING CIRCUIT (104)

422
RESPONSIVE TO DETERMINING THAT THE PIPELINE FLUSH HAS BEEN INITIATED, SELECTIVELY INVALIDATING, BY THE DEPENDENCY IDENTIFIER CIRCUIT (146), A SECOND ONE OR MORE ENTRIES (150(0)) OF THE STORE INSTRUCTION QUEUE (148) BASED ON CORRESPONDING ONE OR MORE AGE INDICATORS (204(0)) OF THE SECOND ONE OR MORE ENTRIES (150(0))

FIG. 4C

PERFORMING MEMORY DEPENDENCY IDENTIFICATION WITHOUT PREVIOUSLY ENCOUNTERED READ-AFTER-WRITE (RAW) HAZARDS IN PROCESSOR DEVICES

TECHNICAL FIELD

The technology of the disclosure relates generally to out-of-order execution of computer-executable instructions by processor devices, and, in particular, to handling memory dependencies between store instructions and subsequent load instructions.

BACKGROUND

Out-of-order processing is a conventional technique for improving the efficiency of processor devices by executing computer-executable instructions in an order based on the availability of input data required by each instruction and the availability of an appropriate execution unit, rather than the program order of the instructions. An out-of-order processor device can execute an instruction as soon as all input data to be consumed by the instruction has been produced. This enables processor cycles that would otherwise be wasted waiting for earlier instructions to complete to be productively used.

However, the degree to which out-of-order processing can improve processor efficiency may be limited based on memory dependencies that can arise between pairs of instructions, and that may preclude the reordering or parallel execution of such instructions. For instance, reordering and parallel execution may be prevented by an occurrence of a read-after-write (RAW) hazard that arises when a younger load instruction is executed before the successful execution and completion of an older store instruction with a same target address as the load instruction. An occurrence of a RAW hazard may force the processor device to recover by performing a time-and computationally-expensive replay of the load instruction, or even by flushing the instruction execution pipeline in which the RAW hazard occurs. This results in a negative impact on the performance of the processor device.

To attempt to avoid RAW hazards, some conventional processor devices provide a dependency predictor circuit that is configured to perform "warm" memory dependency prediction. Such a dependency predictor circuit may record an occurrence of a RAW hazard between a store instruction and a subsequent load instruction, and when the same store instruction and load instruction are encountered again, the dependency predictor circuit establishes a dependency between the load instruction and the store instruction. This forces the load instruction to execute in-order with respect to the store instruction, thereby avoiding the possibility of another occurrence of the RAW hazard. The dependency predictor circuit, though, is considered to perform "warm" memory dependency prediction because it must be trained by first detecting an occurrence of the RAW hazard before the memory dependency between the store instruction and the load instruction can be established. Moreover, the coverage that can be provided by such a dependency predictor circuit is limited by its size.

SUMMARY OF THE DISCLOSURE

Aspects disclosed in the detailed description include performing "cold" memory dependency identification in processor devices. Related apparatus, methods, and computer-readable media are also disclosed. In this regard, in some exemplary aspects disclosed herein, a processor device provides a dependency identifier circuit that is configured to perform "cold" memory dependency identification (i.e., identifying a memory dependency between a store instruction and a subsequent load instruction without having previously encountered a read-after-write (RAW) hazard resulting from out-of-order execution of the store instruction and the load instruction). The dependency identifier circuit comprises a store instruction queue that includes a plurality of entries. Each entry is configured to store a physical register number, an immediate value, and an age indicator (e.g., a reorder buffer index or a store unit identifier, as non-limiting examples) of a store instruction.

In exemplary operation, the dependency identifier circuit detects a store instruction in a front end of an instruction processing circuit of the processor device. The store instruction comprises a single store address register number, mapped to a store physical register number, and a single store immediate value. The dependency identifier circuit writes the store physical register number, the store immediate value, and an age indicator in an entry of the store instruction queue. The dependency identifier circuit later detects a load instruction in the front end of the instruction processing circuit, wherein the load instruction comprises a single load address register number, mapped to a load physical register number, and a single load immediate value. The dependency identifier circuit determines whether any entries of the store instruction queue store the load physical register number and the load immediate value. If so, the dependency predictor circuit selects one such entry, and establishes a dependency between the load instruction and a store instruction corresponding to the selected entry (i.e., using conventional mechanisms provided by the processor device for establishing and tracking instruction dependencies).

In some aspects, the dependency identifier circuit may determine that execution of the store instruction has been initiated by the instruction processing circuit. In response, the dependency identifier circuit invalidates the entry of the store instruction queue corresponding to the store instruction, which ensures that the corresponding load instruction does not cause the processor device to hang. Some aspects may provide that the dependency identifier circuit determines that a pipeline flush has been initiated by the instruction processing circuit. Responsive to determining that the pipeline flush has been initiated, the dependency identifier circuit in such aspects may selectively invalidate one or more entries of the store instruction queue based on corresponding one or more age indicators of the one or more entries.

Some aspects of the processor device may also provide a dependency predictor circuit that is configured to perform "warm" memory dependency prediction (e.g., in parallel with the dependency identifier circuit, in response to the dependency identifier circuit determining that no entries of the store instruction queue store the load physical register number and the load immediate value, and/or prior to the dependency identifier circuit determining whether any of the entries store the load physical register number and the load immediate value). In such aspects, the dependency predictor circuit determines whether a prior occurrence of RAW hazard occurred as a result of out-of-order execution of the store instruction and the load instruction. If so, the dependency predictor circuit establishes a dependency between the store instruction and the load instruction in conventional fashion.

In another aspect, a processor device is disclosed. The processor device comprises an instruction processing circuit, and a dependency identifier circuit comprising a store instruction queue that comprises a plurality of entries. The dependency identifier circuit is configured to detect a store instruction in a front end of the instruction processing circuit, wherein the store instruction comprises a single store address register number mapped to a store physical register number, and a store immediate value. The dependency identifier circuit is further configured to write the store physical register number, the store immediate value, and an age indicator in an entry of the plurality of entries of the store instruction queue. The dependency identifier circuit is also configured to subsequently detect a load instruction in the front end of the instruction processing circuit, wherein the load instruction comprises a single load address register number mapped to a load physical register number, and a load immediate value. The dependency identifier circuit is additionally configured to determine whether one or more entries of the store instruction queue store the load physical register number and the load immediate value. The dependency identifier circuit is further configured to, responsive to determining that the one or more entries of the store instruction queue store the load physical register number and the load immediate value, select an entry of the one or more entries. The dependency identifier circuit is further also configured to establish a dependency between the load instruction and a store instruction corresponding to the selected entry.

In another aspect, a processor device is disclosed. The processor device comprises means for detecting a store instruction in a front end of an instruction processing circuit, wherein the store instruction comprises a single store address register number mapped to a store physical register number, and a store immediate value. The processor device further comprises means for writing the store physical register number, the store immediate value, and an age indicator in an entry of a plurality of entries of a store instruction queue. The processor device also comprises means for subsequently detecting a load instruction in the front end of the instruction processing circuit, wherein the load instruction comprises a single load address register number mapped to a load physical register number, and a load immediate value. The processor device additionally comprises means for determining whether one or more entries of the store instruction queue store the load physical register number and the load immediate value. The processor device further comprises means for selecting an entry of the one or more entries, responsive to determining that the one or more entries of the store instruction queue store the load physical register number and the load immediate value. The processor device also comprises means for establishing a dependency between the load instruction and a store instruction corresponding to the selected entry.

In another aspect, a method for performing "cold" memory dependency identification in processor devices is disclosed. The method comprises detecting, by a dependency identifier circuit of a processor device, a store instruction in a front end of an instruction processing circuit of the processor device, wherein the store instruction comprises a single store address register number mapped to a store physical register number, and a store immediate value. The method further comprises writing, by the dependency identifier circuit, the store physical register number, the store immediate value, and an age indicator in an entry of a plurality of entries of a store instruction queue. The method also comprises subsequently detecting, by the dependency identifier circuit, a load instruction in the front end of the instruction processing circuit, wherein the load instruction comprises a single load address register number mapped to a load physical register number, and a load immediate value. The method additionally comprises determining, by the dependency identifier circuit, that one or more entries of the store instruction queue store the load physical register number and the load immediate value. The method further comprises, responsive to determining that the one or more entries of the store instruction queue store the load physical register number and the load immediate value, selecting, by the dependency identifier circuit, an entry of the one or more entries. The method also comprises establishing, by the dependency identifier circuit, a dependency between the load instruction and a store instruction corresponding to the selected entry.

In another aspect, a non-transitory computer-readable medium is disclosed. The non-transitory computer-readable medium stores computer-executable instructions that, when executed by a processor device, cause a dependency identifier circuit of the processor device to detect a store instruction in a front end of an instruction processing circuit of the dependency identifier circuit, wherein the store instruction comprises a single store address register number mapped to a store physical register number, and a store immediate value. The computer-executable instructions further cause the dependency identifier circuit to write the store physical register number, the store immediate value, and an age indicator in an entry of the plurality of entries of a store instruction queue. The computer-executable instructions also cause the dependency identifier circuit to subsequently detect a load instruction in the front end of the instruction processing circuit, wherein the load instruction comprises a single load address register number mapped to a load physical register number, and a load immediate value. The computer-executable instructions additionally cause the dependency identifier circuit to determine whether one or more entries of the store instruction queue store the load physical register number and the load immediate value. The computer-executable instructions further cause the dependency identifier circuit to, responsive to determining that the one or more entries of the store instruction queue store the load physical register number and the load immediate value, select an entry of the one or more entries. The computer-executable instructions also cause the dependency identifier circuit to establish a dependency between the load instruction and a store instruction corresponding to the selected entry.

BRIEF DESCRIPTION OF THE FIGURES

FIG. 3 is a diagram illustrating an exemplary store instruction and an exemplary dependent load instruction that may be identified by the dependency identifier circuit of FIG. 1, according to some aspects;

FIGS. 4A-4C are flowcharts illustrating exemplary operations performed by the dependency identifier circuit of FIG. 1 for performing "cold" memory dependency identification, according to some aspects;

DETAILED DESCRIPTION

Figure 1:
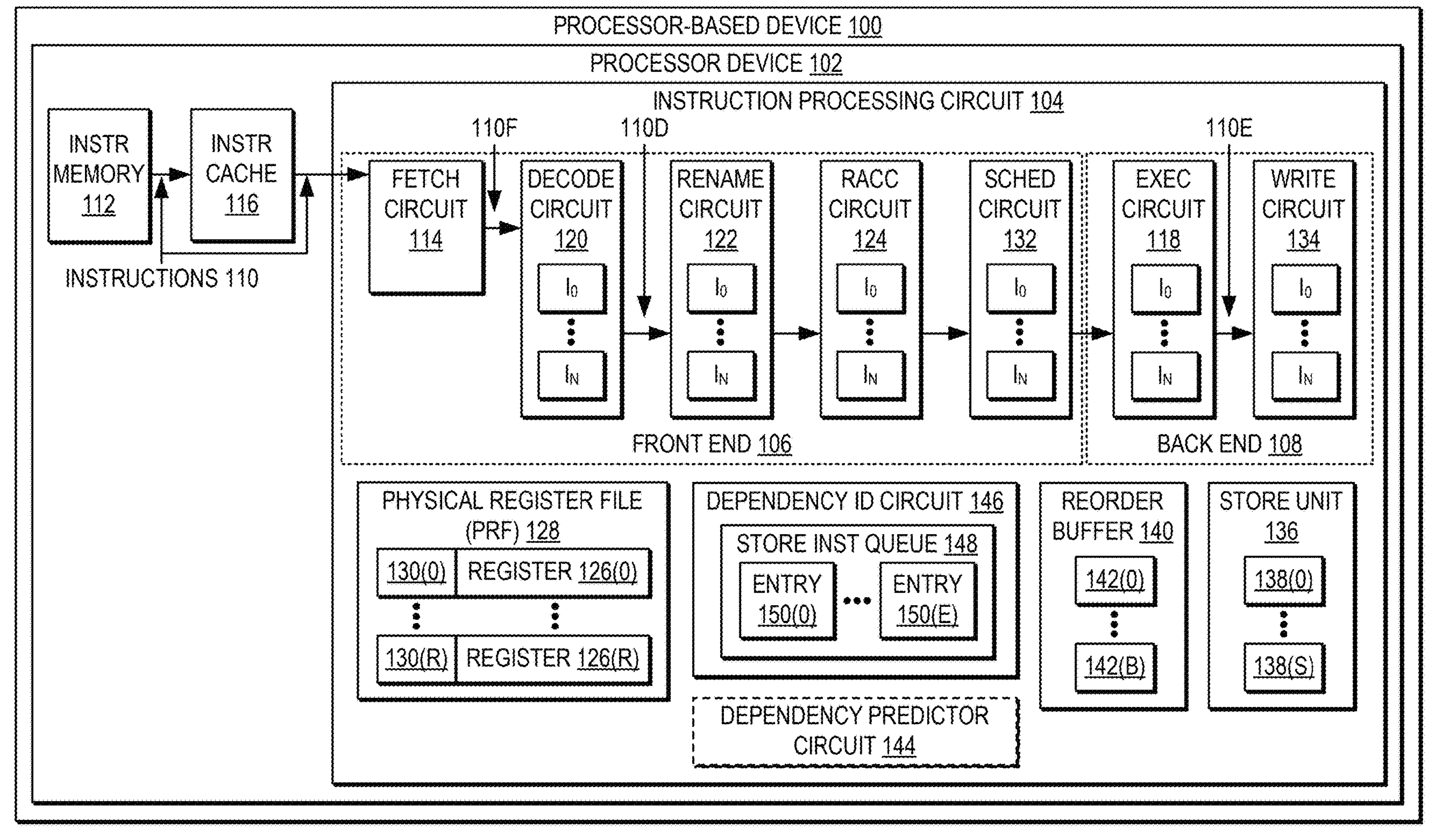
FIG. 1 is a diagram of an exemplary processor-based system that includes a processor with an instruction processing circuit that includes a dependency identifier circuit configured to perform "cold" memory dependency identification, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise expressly indicated.

Aspects disclosed in the detailed description include performing "cold" memory dependency identification in processor devices. Related apparatus, methods, and computer-readable media are also disclosed. In this regard, in some exemplary aspects disclosed herein, a processor device provides a dependency identifier circuit that is configured to perform "cold" memory dependency identification (i.e., identifying a memory dependency between a store instruction and a subsequent load instruction without having previously encountered a read-after-write (RAW) hazard resulting from out-of-order execution of the store instruction and the load instruction). The dependency identifier circuit comprises a store instruction queue that includes a plurality of entries. Each entry is configured to store a physical register number, an immediate value, and an age indicator (e.g., a reorder buffer index or a store unit identifier, as non-limiting examples) of a store instruction.

In exemplary operation, the dependency identifier circuit detects a store instruction in a front end of an instruction processing circuit of the processor device. The store instruction comprises a single store address register number, mapped to a store physical register number, and a single store immediate value. The dependency identifier circuit writes the store physical register number, the store immediate value, and an age indicator in an entry of the store instruction queue. The dependency identifier circuit later detects a load instruction in the front end of the instruction processing circuit, wherein the load instruction comprises a single load address register number, mapped to a load physical register number, and a single load immediate value. The dependency identifier circuit determines whether any entries of the store instruction queue store the load physical register number and the load immediate value. If so, the dependency predictor circuit selects one such entry, and establishes a dependency between the load instruction and a store instruction corresponding to the selected entry (i.e., using conventional mechanisms provided by the processor device for establishing and tracking instruction dependencies).

In some aspects, the dependency identifier circuit may determine that execution of the store instruction has been initiated by the instruction processing circuit. In response, the dependency identifier circuit invalidates the entry of the store instruction queue corresponding to the store instruction, which ensures that the corresponding load instruction does not cause the processor device to hang. Some aspects may provide that the dependency identifier circuit determines that a pipeline flush has been initiated by the instruction processing circuit. Responsive to determining that the pipeline flush has been initiated, the dependency identifier circuit in such aspects may selectively invalidate one or more entries of the store instruction queue based on corresponding one or more age indicators of the one or more entries.

Some aspects of the processor device may also provide a dependency predictor circuit that is configured to perform "warm" memory dependency prediction (e.g., in parallel with the dependency identifier circuit, in response to the dependency identifier circuit determining that no entries of the store instruction queue store the load physical register number and the load immediate value, and/or prior to the dependency identifier circuit determining whether any of the entries store the load physical register number and the load immediate value). In such aspects, the dependency predictor circuit determines whether a prior occurrence of RAW hazard occurred as a result of out-of-order execution of the store instruction and the load instruction. If so, the dependency predictor circuit establishes a dependency between the store instruction and the load instruction in conventional fashion.

In this regard, FIG. 1 is a diagram of an exemplary processor-based device 100 that includes a processor device 102. The processor device 102, which also may be referred to as a "processor core" or a "central processing unit (CPU) core," may be an in-order or an out-of-order processor (OoP), and/or may be one of a plurality of processor devices 102 provided by the processor-based device 100. In the example of FIG. 1, the processor device 102 includes an instruction processing circuit 104 comprising a front end 106, in which instructions 110 are fetched, decoded, and issued, and a back end 108 in which the instruction 110 are executed and the results committed. The instruction processing circuit 104 includes one or more instruction pipelines $I_0$-$I_N$ for processing the instructions 110 fetched from an instruction memory (captioned as "INSTR MEMORY" in FIG. 1) 112 by a fetch circuit 114 for execution. The instruction memory 112 may be provided in or as part of a system memory in the processor-based device 100, as a non-limiting example. An instruction cache (captioned as "INSTR CACHE" in FIG. 1) 116 may also be provided in the processor device 102 to cache the instructions 110 fetched from the instruction memory 112 to reduce latency in the fetch circuit 114.

The fetch circuit 114 in the example of FIG. 1 is configured to provide the instructions 110 as fetched instructions 110F into the one or more instruction pipelines $I_0$-$I_N$ in the instruction processing circuit 104 to be pre-processed, before the fetched instructions 110F reach an execution circuit (captioned as "EXEC CIRCUIT" in FIG. 1) 118 to be executed. The instruction pipelines $I_0$-$I_N$ are provided across different processing circuits or stages of the instruction processing circuit 104 to pre-process and process the fetched instructions 110F in a series of steps that can be performed concurrently to increase throughput prior to execution of the fetched instructions 110F by the execution circuit 118.

With continuing reference to FIG. 1, the instruction processing circuit 104 includes a decode circuit 120 configured to decode the fetched instructions 110F fetched by the fetch circuit 114 into decoded instructions 110D to determine the instruction type and actions required. The instruction type and action required encoded in the decoded instruction 110D may also be used to determine in which instruction pipeline $I_0$-$I_N$ the decoded instructions 110D should be placed. In this example, the decoded instructions 110D are placed in one or more of the instruction pipelines $I_0$-$I_N$ and are next provided to a rename circuit 122 in the instruction processing circuit 104. The rename circuit 122 is configured to determine if any register names in the decoded instructions 110D should be renamed to decouple any register dependencies that would prevent parallel or out-of-order processing.

The instruction processing circuit 104 in the processor device 102 in FIG. 1 also includes a register access circuit (captioned as "RACC CIRCUIT" in FIG. 1) 124. The register access circuit 124 is configured to access physical registers (captioned as "REGISTER" in FIG. 1) 126(0)-126(R) in a physical register file (PRF) 128. Each of the physical registers 126(0)-126(R) has a corresponding physical register number 130(0)-130(R) that can be mapped to a logical register number using, e.g., mapping entries of a register mapping table (RMT) (not shown). In this manner, the register access circuit 124 can access a source register operand of a decoded instruction 110D to retrieve a produced value from an executed instruction 110E in the execution circuit 118. The register access circuit 124 is also configured to provide the retrieved produced value from an executed instruction 110E as the source register operand of a decoded instruction 110D to be executed.

The instruction processing circuit 104 further includes a scheduler circuit (captioned as "SCHED CIRCUIT" in FIG. 1) 132 in the instruction pipeline $I_0$-$I_N$, which is configured to store decoded instructions 110D in reservation entries (not shown) until all source register operands for the decoded instruction 110D are available. The scheduler circuit 132 issues decoded instructions 110D that are ready to be executed to the execution circuit 118. A write circuit 134 is also provided in the instruction processing circuit 104 to write back or commit produced values from executed instructions 110E to memory (such as the PRF), cache memory, or system memory.

The execution circuit 118 in FIG. 1 may comprise or be communicatively coupled to additional execution units, functional units, and/or data structures to facilitate instruction execution. In the example of FIG. 1, the execution circuit 118 employs a store unit 136 that stores store unit identifiers 138(0)-138(S) for store instructions that have not yet been committed. The execution circuit 118 of FIG. 1 is also communicatively coupled to a reorder buffer 140 that enables out-of-order execution of the fetched instructions 110F. The reorder buffer 140 contains reorder buffer entries (not shown) that are allocated to each instruction 110 that is being processed by the instruction processing circuit 104, but that has not yet been committed. Each reorder buffer entry is allocated sequentially in program order to the instructions 110, and a reorder buffer index 142(0)-142(B) that identifies the position of each reorder buffer entry in the reorder buffer 140 for each instruction 110 is reported back to the instruction processing circuit 104 when the reorder buffer entry is initially allocated. The reorder buffer 140 also may include a read pointer (not shown) that points to the reorder buffer index 142(0)-142(B) of the reorder buffer entry from which information about the oldest uncommitted instruction 110 is read when it is committed, and a write pointer (not shown) that indicates the reorder buffer index 142(0)-142(B) of the last reorder buffer entry to which information is written about the youngest uncommitted instruction 110.

As noted above, the degree to which out-of-order processing can improve the efficiency of the processor device 102 may be limited based on memory dependencies that can arise between pairs of instructions, which may prevent instructions from being reordered or executed in parallel. For instance, reordering and parallel execution may be prevented by an occurrence of a RAW hazard that arises when a younger load instruction (not shown) is executed before the successful execution and completion of an older store instruction (not shown) with a same target address as the load instruction. To attempt to avoid RAW hazards, some aspects of the processor device 102 provide a dependency predictor circuit 144 that is configured to perform "warm" memory dependency prediction. However, "warm" predictors such as the dependency predictor circuit 144 must be trained by first detecting an occurrence of a RAW hazard before a memory dependency between the store instruction and the load instruction can be established.

In this regard, the processor device 102 of FIG. 1 provides a dependency identifier circuit (captioned as "DEPENDENCY ID CIRCUIT" in FIG. 1) 146 that is configured to perform "cold" memory dependency identification. The dependency identifier circuit 146 comprises a store instruction queue (captioned as "STORE INST QUEUE" in FIG. 1) 148 that includes a plurality of entries 150(0)-150(E). The store instruction queue 148 may be implemented as, e.g., a circular queue using a head pointer (not shown) indicating an oldest entry 150(0)-150(E) and a tail pointer (not shown) indicating a youngest entry 150(0)-150(E). Each of the entries 150(0)-150(E) stores information for a store instruction (not shown) that is detected by the dependency identifier circuit 146 in the front end 106 of the instruction processing circuit 104. Exemplary constituent elements of the entries 150(0)-150(E) of the store instruction queue 148 are illustrated in greater detail below with respect to FIG. 2.

If a store instruction detected by the dependency identifier circuit 146 in the front end 106 comprises a single store address register number (not shown) and a single store immediate value (not shown), the dependency identifier circuit 146 stores a store physical register number (such as one of the physical register numbers 130(0)-130(R)) to which the store address register number is mapped as a logical address number, along with the store immediate value and an age indicator (not shown) for the store instruction, in one of the entries 150(0)-150(E). Upon detecting a subsequent load instruction (not shown) that comprises a single load address register number (not shown) and a single load immediate value (not shown), the dependency identifier circuit 146 searches the store instruction queue 148 to determine whether there exists an entry of entries 150(0)-150(E) that stores a load physical register number, to which the load address register number is mapped as a logical register number, and the load immediate value. If so, the dependency identifier circuit 146 establishes a dependency between the load instruction and the store instruction corresponding to the identified entry 150(0)-150(E) using conventional techniques. The operations performed by the dependency identifier circuit 146 for identifying memory dependencies between store instructions and load instructions are discussed in greater detail below with respect to FIG. 3.

In some aspects, the dependency identifier circuit 146 may determine that execution of the store instruction has been initiated by the instruction processing circuit 104. In response, the dependency identifier circuit 146 invalidates the entry of the store instruction queue corresponding to the store instruction (e.g., by setting a valid indicator (not shown) of the entry to a value of false). Some aspects may provide that the dependency identifier circuit 146 determines that a pipeline flush has been initiated by the instruction processing circuit 104. Responsive to determining that the pipeline flush has been initiated, the dependency identifier circuit 146 in such aspects may selectively invalidate one or more entries 150(0)-150(E) of the store instruction queue 148 based on corresponding one or more age indicators of the one or more entries 150(0)-150(E).

Figure 2:
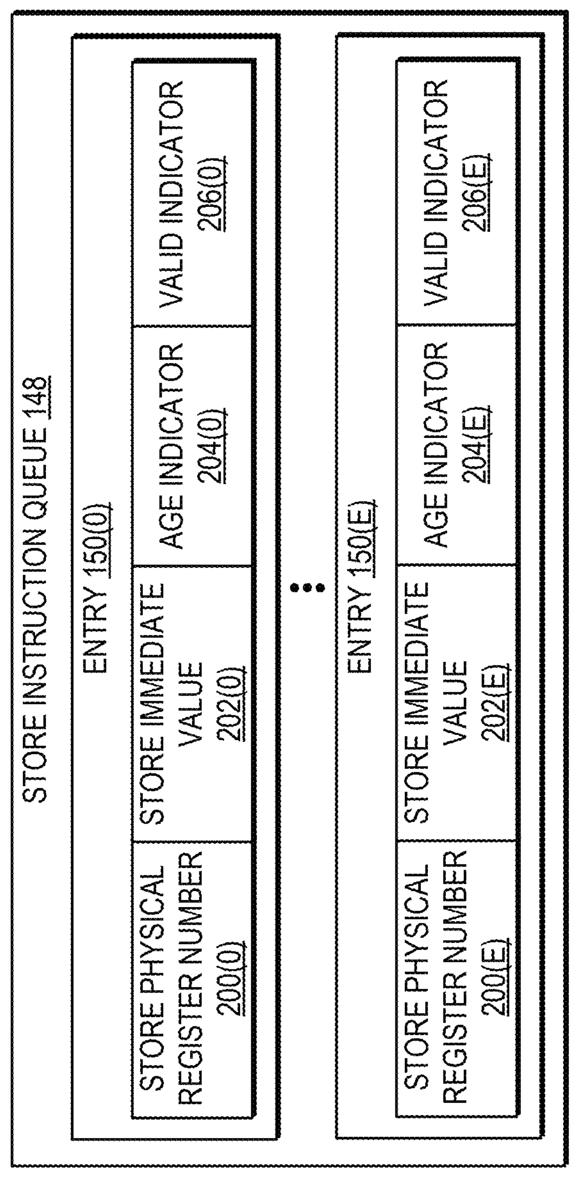
FIG. 2 is a diagram illustrating exemplary constituent elements of the store instruction queue of the dependency identifier circuit of FIG. 1, according to some aspects.

FIG. 2 illustrates exemplary elements of the entries 150 (0)-150(E) of the store instruction queue 148 of FIG. 1 in greater detail. In FIG. 2, the entries 150(0)-150(E) comprise respective store physical register numbers 200(0)-200(E) to which store address register numbers (not shown) of store instructions (not shown) that were detected by the dependency identifier circuit 146 of FIG. 1 in the front end 106 of the instruction processing circuit 104 are mapped. The entries 150(0)-150(E) further comprise respective store immediate values 202(0)-202(E) of the detected store instructions. In addition, the entries 150(0)-150(E) store respective age indicators 204(0)-204(E) that comprise data that may be used by the dependency identifier circuit 146 to determine a relative age of store instructions corresponding to the entries 150(0)-150(E). Each of the age indicators 204(0)-204(E) may comprise, e.g., a reorder buffer index (such as the reorder buffer indices 142(0)-142(B) of FIG. 2) corresponding to the store instruction, or a store unit identifier (e.g., the store unit identifiers 138(0)-138(S) of FIG. 1) corresponding to the store instruction. Finally, the entries 150(0)-150(E) of FIG. 2 include respective valid indicators 206(0)-206(E), each of which may comprise a Boolean value indicating whether the corresponding entry 150(0)-150(E) is valid. It is to be understood that some aspects of the entries 150(0)-150(E) may include more, fewer, and/or different elements than those illustrated in FIG. 2.

To illustrate operations performed by the dependency identifier circuit 146 of FIG. 1 for identifying memory dependencies between store instructions and load instructions, FIG. 3 is provided. In FIG. 3, an instruction stream 300 that is being executed by the instruction processing circuit 104 of FIG. 1 includes a store instruction 302 that comprises a store address register number 304 (i.e., register X1, in this example) that stores a base address, and further comprises a store immediate value 306 (i.e., the value 32, in this example) that stores an offset. When executed, the store instruction 302 stores a value read from register X0 into the address determined by adding the store immediate value 306 to the address stored in the store address register number 304. The store address register number 304 is mapped to a store physical register number (i.e., one of the physical register numbers 130(0)-130(R) of FIG. 1) as a logical register number.

The instruction stream 300 of FIG. 3 also includes a load instruction 308 that comprises a load address register number 310 (i.e., register X1, in this example) and a load immediate value 312 (i.e., the value 32, in this example). When the load instruction 308 is executed, a value that is stored at the address determined by adding the load immediate value 312 to the address stored in the load address register number 310 is read and placed in register X18. Like the store address register number 304, the load address register number 310 is mapped to a load physical register number (i.e., one of the physical register numbers 130(0)-130(R) of FIG. 1) as a logical register number.

To determine whether a memory dependency exists between the load instruction 308 and the previous store instruction 302, the dependency identifier circuit 146 first detects the store instruction 302 in the front end 106 of the instruction processing circuit 104 of the processor device 102. Upon determining that the store instruction 302 comprises the single store address register number 304 and the single store immediate value 306, the dependency identifier circuit 146 writes a store physical register number (e.g., the physical register number 130(0) of FIG. 1) to which the store address register number 304 is mapped, along with the store immediate value 306 and an age indicator (not shown), in an entry such as the entry 150(0) of the store instruction queue 148. The dependency identifier circuit 146 subsequently detects the load instruction 308 in the front end 106 of the instruction processing circuit 104, and determines that the load instruction 308 comprises the single load address register number 310 (mapped to a load physical register number such as the physical register number 130(0)) and the load immediate value 312.

The dependency identifier circuit 146 next determines whether one or more of the entries 150(0)-150(E) of the store instruction queue 148 store the load physical register number 130(0) and the load immediate value 312. When the dependency identifier circuit 146 identifies the entry 150(0) as storing the load physical register number 130(0) and the load immediate value 312 (i.e., the same values as the store physical register number 304 and the store immediate value 306), the dependency identifier circuit 146 selects the entry 150(0). The dependency identifier circuit 146 then establishes a dependency between the load instruction 308 and the store instruction 302 corresponding to the selected entry 150(0).

Figure 4B:
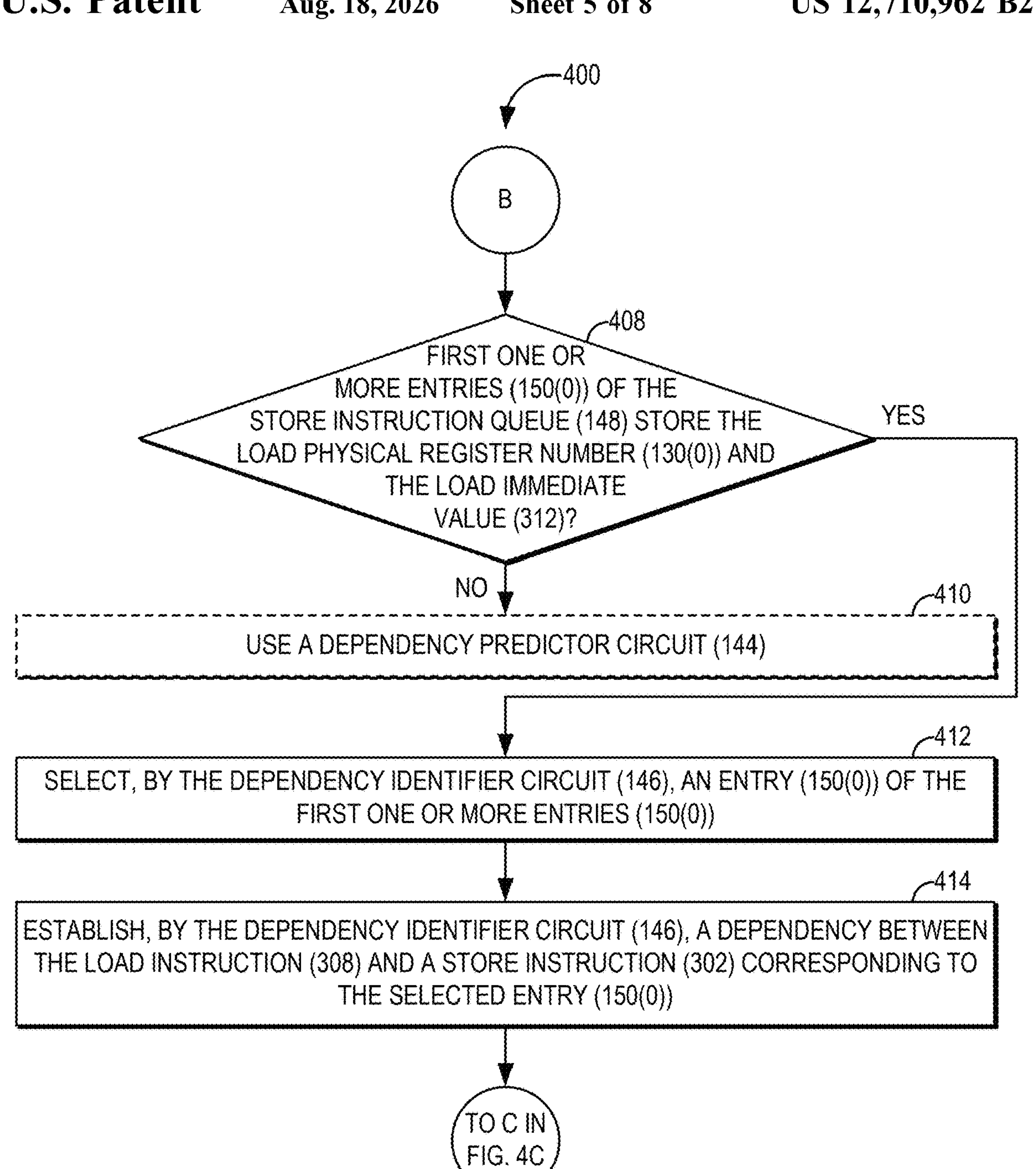

To illustrate operations performed by the dependency identifier circuit 146 of FIG. 1 for performing "cold" memory dependency identification according to some aspects, FIGS. 4A-4C provide a flowchart showing exemplary operations 400. For the sake of clarity, elements of FIGS. 1-3 are referenced in describing FIGS. 4A-4C. It is to be understood that some aspects may provide that some operations illustrated in FIGS. 4A-4C may be performed in an order other than that illustrated herein, and/or may be omitted.

The exemplary operations 400 begin in FIG. 4A with a dependency identifier circuit (e.g., the dependency identifier circuit 146 of FIG. 1) of a processor device (such as the processor device 102 of FIG. 1) detecting a store instruction (e.g., the store instruction 302 of FIG. 3) in a front end (such as the front end 106 of FIG. 1) of an instruction processing circuit (e.g., the instruction processing circuit 104 of FIG. 1) of the processor device 102, wherein the store instruction 302 comprises a store address register number (such as the store address register number 304 of FIG. 3) mapped to a store physical register number (e.g., the physical register number 130(0) of FIG. 1), and a store immediate value (such as the store immediate value 306 of FIG. 3) (block 402). The dependency identifier circuit 146 writes the store physical register number 130(0), the store immediate value 306, and an age indicator (e.g., the age indicator 204(0) of FIG. 2) in an entry (such as the entry 150(0) of FIGS. 1 and 2) of a plurality of entries (e.g., the entries 150(0)-150(E) of FIGS. 1 and 2) of a store instruction queue (such as the store instruction queue 148 of FIGS. 1 and 2) (block 404). The dependency identifier circuit 146 subsequently detects a load instruction (e.g., the load instruction 308 of FIG. 3) in the front end 106 of the instruction processing circuit 104, wherein the load instruction 308 comprises a load address register number (such as the load address register number 310 of FIG. 3) mapped to a load physical register number (e.g., the physical register number 130(0) of FIG. 1), and a load immediate value (such as the load immediate value 312 of FIG. 3) (block 406). The exemplary operations 400 continue at block 408 of FIG. 4B.

Turning now to FIG. 4B, the dependency identifier circuit 146 next determines whether a first one or more entries (e.g., the entry 150(0) of FIGS. 1 and 2) of the store instruction queue 148 store the load physical register number 130(0) and the load immediate value 312 (block 408). If not, some aspects of the processor device may use a dependency predictor circuit (such as the dependency predictor circuit 144 of FIG. 1) to perform "warm" memory dependency prediction, as discussed below in greater detail with respect to FIG. 5 (block 410). However, if the dependency identifier circuit 146 determines at decision block 408 that one or more entries such as the entry 150(0) stores the load physical register number 130(0) and the load immediate value 312, the dependency identifier circuit 146 selects an entry (such as the entry 150(0) of FIGS. 1 and 2) of the first one or more entries 150(0) (block 412). The dependency identifier circuit 146 then establishes a dependency between the load instruction 308 and a store instruction (such as the store instruction 302 of FIG. 3) corresponding to the selected entry 150(0) (block 414). According to some aspects, the exemplary operations 400 may continue at block 416 of FIG. 4C.

With continuing reference to FIG. 4C, the dependency identifier circuit 146 in some aspects may determine that execution of the store instruction 302 has been initiated by the instruction processing circuit 104 (block 416). In response, the dependency identifier circuit 146 invalidates the entry 150(0) of the store instruction queue 148 corresponding to the store instruction 302 (e.g., by setting a valid indicator such the valid indicator 206(0) of FIG. 2 to a value of false) (block 418). Some aspects may provide that the dependency identifier circuit 146 determines that a pipeline flush has been initiated by the instruction processing circuit 104 (block 420). Responsive to determining that the pipeline flush has been initiated, the dependency identifier circuit 146 in such aspects may selectively invalidate a second one or more entries (such as the entry 150(0) of FIGS. 1 and 2) of the store instruction queue 148 based on corresponding one or more age indicators (e.g., the age indicator 204(0) of FIG. 2) of the second one or more entries 150(0) (block 422).

Figure 5:
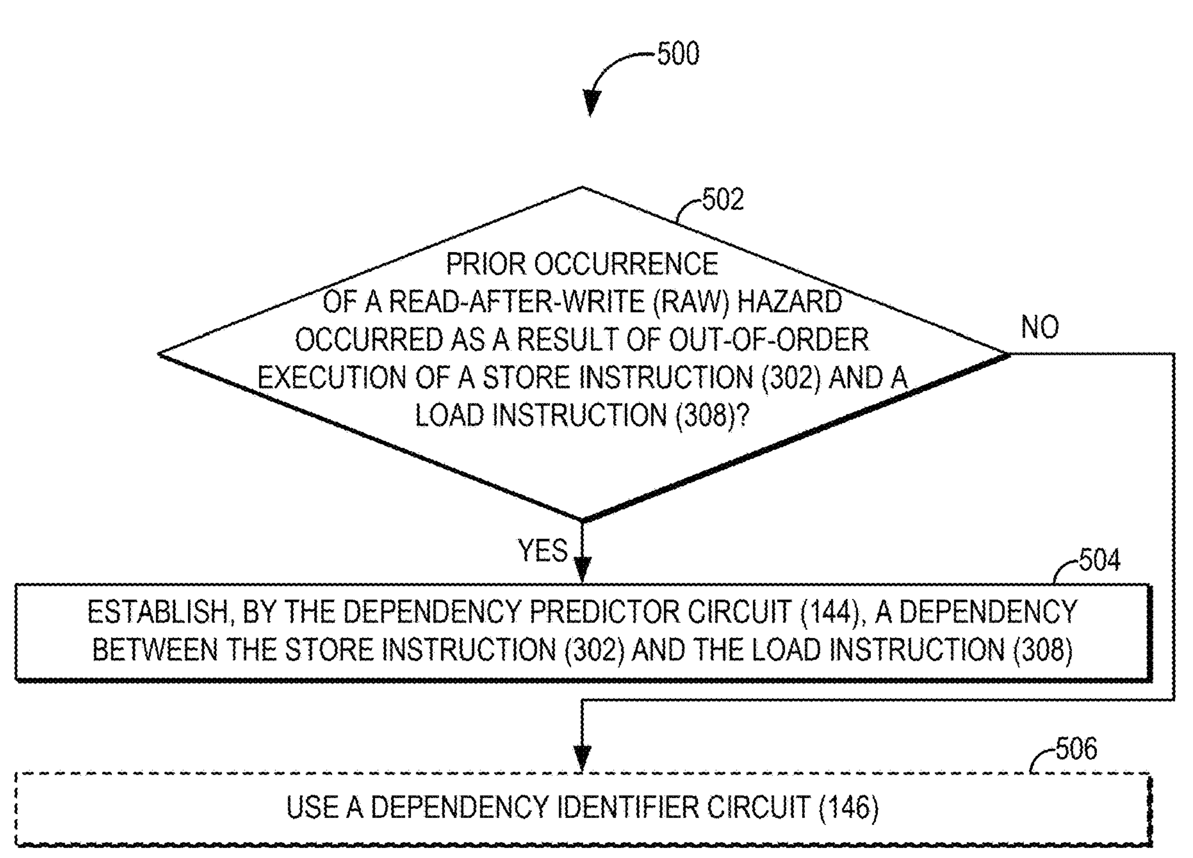
FIG. 5 is a flowchart illustrating further exemplary operations performed by the dependency predictor circuit of FIG. 1 for performing "warm" memory dependency prediction, according to some aspects.

As noted above, some aspects of the processor device 102 of FIG. 1 may include a dependency predictor circuit, such as the dependency predictor circuit 144 of FIG. 1, to perform "warm" memory dependency prediction. The "warm" memory dependency prediction may be performed by the dependency predictor circuit 144 in parallel with the dependency identifier circuit 146, in response to the dependency identifier circuit 146 determining that none of the entries 150(0)-150(E) store the load physical register number 130 (0) and the load immediate value 312, and/or prior to the dependency identifier circuit 146 determining whether any of the entries 150(0)-150(E) store the load physical register number 130(0) and the load immediate value 312. In this regard, FIG. 5 is a flowchart illustrating further exemplary operations 500 performed by the dependency predictor circuit 144 of FIG. 1 in such aspects for performing "warm" memory dependency prediction. Elements of FIGS. 1-3 are referenced in describing FIG. 5 for the sake of clarity. It is to be understood that some aspects may provide that some operations illustrated in FIG. 5 may be performed in an order other than that illustrated herein, and/or may be omitted.

In FIG. 5, the exemplary operations 500 begin with dependency predictor circuit 144 determining whether a prior occurrence of RAW hazard occurred as a result of out-of-order execution of a store instruction (e.g., the store instruction 302 of FIG. 3) and a load instruction (such as the load instruction 308 of FIG. 3) (block 502). If so, the dependency predictor circuit 144 establishes a dependency between the store instruction 302 and the load instruction 308 in conventional fashion (block 504). In some aspects, if the dependency predictor circuit 144 determines at block 502 that no RAW hazard has previously occurred as a result of out-of-order execution of the store instruction 302 and the load instruction 308, the dependency predictor circuit 144 may use a dependency identifier circuit (such as the dependency identifier circuit 146 of FIG. 1) in the manner described above with respect to FIGS. 4A-4C (block 506).

The processor device according to aspects disclosed herein and discussed with reference to FIGS. 1-3, 4A-4C, and 5 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
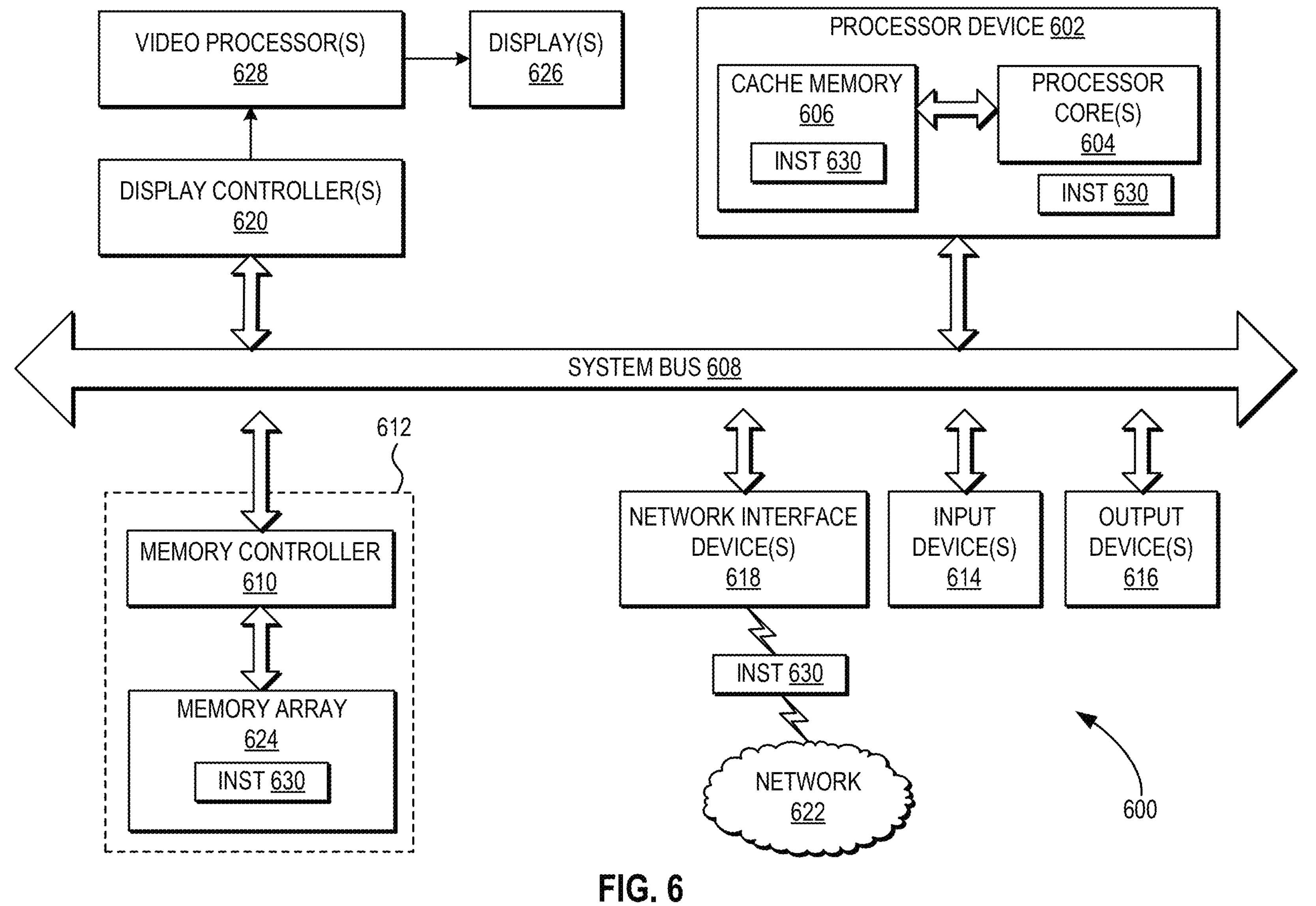
FIG. 6 is a block diagram of an exemplary processor-based device that can include the dependency identifier circuit of FIG. 1.

In this regard, FIG. 6 illustrates an example of a processor-based device 600, which corresponds in functionality to the processor-based device 100 of FIG. 1. In this example, the processor-based device 600 includes a processor device 602 (corresponding to the processor device 102 of FIG. 1) that comprises one or more processor cores 604 coupled to a cache memory 606. The processor device 602 is also coupled to a system bus 608 and can intercouple devices included in the processor-based device 600. As is well known, the processor device 602 communicates with these other devices by exchanging address, control, and data information over the system bus 608. For example, the processor device 602 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624.

The processor device 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

The processor-based device 600 in FIG. 6 may include a set of instructions (captioned as "INST" in FIG. 6) 630 that may be executed by the processor device 602 for any application desired according to the instructions. The instructions 630 may be stored in the memory system 612, the processor device 602, and/or the cache memory 606, each of which may comprise an example of a non-transitory computer-readable medium. The instructions 630 may also reside, completely or at least partially, within the memory system 612 and/or within the processor device 602 during their execution. The instructions 630 may further be transmitted or received over the network 622, such that the network 622 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 630. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
   - an instruction processing circuit; and
   - a dependency identifier circuit comprising a store instruction queue comprising a plurality of entries;
   - the dependency identifier circuit configured to:
     - detect a store instruction in a front end of the instruction processing circuit, wherein the store instruction comprises:
       - a single store address register number mapped to a store physical register number; and
       - a store immediate value;

write the store physical register number, the store immediate value, and an age indicator in an entry of the plurality of entries of the store instruction queue;

subsequently detect a load instruction in the front end of the instruction processing circuit, wherein the load instruction comprises:

a single load address register number mapped to a load physical register number; and a load immediate value;

determine whether a first one or more entries of the store instruction queue store the load physical register number and the load immediate value; and responsive to determining that the first one or more entries of the store instruction queue store the load physical register number and the load immediate value:

select an entry of the first one or more entries; and establish a dependency between the load instruction and a store instruction corresponding to the selected entry.

2. The processor device of clause 1, wherein the dependency identifier circuit is further configured to:

determine that execution of the store instruction has been initiated by the instruction processing circuit; and responsive to determining that execution of the store instruction has been initiated, invalidate the entry of the store instruction queue corresponding to the store instruction.

3. The processor device of any one of clauses 1-2, wherein the age indicator comprises one of a reorder buffer index of the store instruction and a store unit identifier of the store instruction.

4. The processor device of any one of clauses 1-3, wherein the dependency identifier circuit is further configured to:

determine that a pipeline flush has been initiated by the instruction processing circuit; and responsive to determining that the pipeline flush has been initiated, selectively invalidate a second one or more entries of the store instruction queue based on corresponding one or more age indicators of the second one or more entries.

5. The processor device of any one of clauses 1-4, further comprising a dependency predictor circuit configured to:

determine whether a prior occurrence of a read-after-write (RAW) hazard occurred as a result of out-of-order execution of the store instruction and the load instruction; and responsive to determining that a prior occurrence of a RAW hazard occurred, establish a dependency between the store instruction and the load instruction.

6. The processor device of clause 5, wherein the dependency predictor circuit is configured to operate in parallel with the dependency identifier circuit.

7. The processor device of clause 5, wherein the dependency predictor circuit is configured to operate in response to the dependency identifier circuit determining that no entries of the store instruction queue store the load physical register number and the load immediate value.

8. The processor device of clause 5, wherein the dependency identifier circuit is configured to determine whether the first one or more entries of the store instruction queue store the load physical register number and the load immediate value in response to the dependency predictor circuit determining that no prior occurrence of a RAW hazard occurred as a result of out-of-order execution of the store instruction and the load instruction.

9. The processor device of any one of clauses 1-8, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A processor device, comprising:

means for detecting a store instruction in a front end of an instruction processing circuit, wherein the store instruction comprises:

a single store address register number mapped to a store physical register number; and a store immediate value;

means for writing the store physical register number, the store immediate value, and an age indicator in an entry of a plurality of entries of a store instruction queue;

means for subsequently detecting a load instruction in the front end of the instruction processing circuit, wherein the load instruction comprises:

a single load address register number mapped to a load physical register number; and a load immediate value;

means for determining whether one or more entries of the store instruction queue store the load physical register number and the load immediate value;

means for selecting an entry of the one or more entries, responsive to determining that the one or more entries of the store instruction queue store the load physical register number and the load immediate value; and means for establishing a dependency between the load instruction and a store instruction corresponding to the selected entry.

11. A method for performing "cold" memory dependency identification in processor devices, the method comprising:

detecting, by a dependency identifier circuit of a processor device, a first store instruction in a front end of an instruction processing circuit of the processor device, wherein the first store instruction comprises:

a single store address register number mapped to a store physical register number; and a store immediate value;

writing, by the dependency identifier circuit, the store physical register number, the store immediate value, and an age indicator in an entry of a plurality of entries of a store instruction queue;

subsequently detecting, by the dependency identifier circuit, a first load instruction in the front end of the instruction processing circuit, wherein the first load instruction comprises:

a first single load address register number mapped to a first load physical register number; and a first load immediate value;

determining, by the dependency identifier circuit, that a first one or more entries of the store instruction queue store the first load physical register number and the first load immediate value; and responsive to determining that the first one or more entries of the store instruction queue store the first load physical register number and the first load immediate value:

selecting, by the dependency identifier circuit, an entry of the first one or more entries; and establishing, by the dependency identifier circuit, a dependency between the first load instruction and a store instruction corresponding to the selected entry.

12. The method of clause 11, further comprising:

determining, by the dependency identifier circuit, that execution of the first store instruction has been initiated by the instruction processing circuit; and responsive to determining that execution of the first store instruction has been initiated, invalidating, by the dependency identifier circuit, the entry of the store instruction queue corresponding to the first store instruction.

13. The method of any one of clauses 11-12, wherein the age indicator comprises one of a reorder buffer index of the first store instruction and a first store unit identifier of the first store instruction.

14. The method of any one of clauses 11-13, further comprising:

determining, by the dependency identifier circuit, that a pipeline flush has been initiated by the instruction processing circuit; and responsive to determining that the pipeline flush has been initiated, selectively invalidating, by the dependency identifier circuit, a second one or more entries of the store instruction queue based on corresponding one or more age indicators of the second one or more entries.

15. The method of any one of clauses 11-14, wherein:

the processor device comprises a dependency predictor circuit; and the method further comprises:

determining, by the dependency predictor circuit, that a prior occurrence of a read-after-write (RAW) hazard occurred as a result of out-of-order execution of a second store instruction and a second load instruction; and responsive to determining that the prior occurrence of the RAW hazard occurred, establishing, by the dependency predictor circuit, a dependency between the second store instruction and the second load instruction.

16. The method of clause 15, wherein the dependency predictor circuit is configured to operate in parallel with the dependency identifier circuit.

17. The method of clause 15, further comprising:

detecting, by the dependency identifier circuit, the second load instruction in the front end of the instruction processing circuit, wherein the second load instruction comprises:

a second load address register number corresponding to a second load physical register number; and a second load immediate value; and determining, by the dependency identifier circuit, that no entries of the store instruction queue store the second load physical register number and the second load immediate value;

wherein the dependency predictor circuit determining that the prior occurrence of the RAW hazard occurred as a result of out-of-order execution of the second store instruction and the second load instruction is responsive to the dependency identifier circuit determining that no entries of the store instruction queue store the second load physical register number and the second load immediate value.

18. The method of clause 15, further comprising, determining, by the dependency predictor circuit, that no prior occurrence of a RAW hazard occurred as a result of out-of-order execution of the first store instruction and the first load instruction;

wherein the dependency identifier circuit determining that the first one or more entries of the store instruction queue store the first load physical register number and the first load immediate value is responsive to the dependency predictor circuit determining that no prior occurrence of a RAW hazard occurred as a result of out-of-order execution of the first store instruction and the first load instruction.

19. A non-transitory computer-readable medium, having stored thereon computer-executable instructions that, when executed by a processor device, cause a dependency identifier circuit of the processor device to:

detect a store instruction in a front end of an instruction processing circuit of the processor device, wherein the store instruction comprises:

a single store address register number mapped to a store physical register number; and a store immediate value;

write the store physical register number, the store immediate value, and an age indicator in an entry of a plurality of entries of a store instruction queue;

subsequently detect a load instruction in the front end of the instruction processing circuit, wherein the load instruction comprises:

a single load address register number mapped to a load physical register number; and a load immediate value;

determine whether a first one or more entries of the store instruction queue store the load physical register number and the load immediate value; and responsive to determining that the first one or more entries of the store instruction queue store the load physical register number and the load immediate value:

select an entry of the first one or more entries, based on corresponding one or more age indicators of the first one or more entries; and establish a dependency between the load instruction and a store instruction corresponding to the selected entry.

20. The non-transitory computer-readable medium of clause 19, wherein the computer-executable instructions further cause the dependency identifier circuit of the processor device to:

determine that execution of the store instruction has been initiated by the instruction processing circuit; and responsive to determining that execution of the store instruction has been initiated, invalidate the entry of the store instruction queue corresponding to the store instruction.

21. The non-transitory computer-readable medium of any one of clauses 19-20, wherein the age indicator comprises one of a reorder buffer index of the store instruction and a store unit identifier of the store instruction.

22. The non-transitory computer-readable medium of any one of clauses 19-21, wherein the computer-executable instructions further cause the dependency identifier circuit of the processor device to:

determine that a pipeline flush has been initiated by the instruction processing circuit; and responsive to determining that the pipeline flush has been initiated, selectively invalidate a second one or more entries of the store instruction queue based on corresponding one or more age indicators of the second one or more entries.

23. The non-transitory computer-readable medium of any one of clauses 19-22, wherein the computer-executable instructions further cause a dependency predictor circuit of the processor device to:

determine whether a prior occurrence of a read-after-write (RAW) hazard occurred as a result of out-of-order execution of the store instruction and the load instruction; and responsive to determining that the prior occurrence of the RAW hazard occurred, establish a dependency between the store instruction and the load instruction.

24. The non-transitory computer-readable medium of clause 23, wherein the computer-executable instructions cause the dependency predictor circuit to operate in parallel with the dependency identifier circuit.

25. The non-transitory computer-readable medium of clause 23, wherein the computer-executable instructions cause the dependency predictor circuit to operate in response to the dependency identifier circuit determining that no entries of the store instruction queue store the load physical register number and the load immediate value.

26. The non-transitory computer-readable medium of clause 23, wherein the computer-executable instructions cause the dependency identifier circuit to determine whether the first one or more entries of the store instruction queue store the load physical register number and the load immediate value in response to the dependency predictor circuit determining that no prior occurrence of a RAW hazard occurred as a result of out-of-order execution of the store instruction and the load instruction.

What is claimed is:

1. A processor device, comprising:

an instruction processing circuit;

a dependency identifier circuit comprising a store instruction queue comprising a plurality of entries; and a dependency predictor circuit;

the dependency identifier circuit configured to:

detect a first store instruction in a front end of the instruction processing circuit, wherein the first store instruction comprises:

a single store address register number mapped to a store physical register number; and a store immediate value;

write the store physical register number, the store immediate value, and an age indicator in an entry of the plurality of entries of the store instruction queue;

subsequently detect a load instruction in the front end of the instruction processing circuit, wherein the load instruction comprises:

a single load address register number mapped to a load physical register number; and a load immediate value;

determine whether a first one or more entries of the store instruction queue store the load physical register number and the load immediate value; and responsive to determining that the first one or more entries of the store instruction queue store the load physical register number and the load immediate value:

select an entry of the first one or more entries; and establish a dependency between the load instruction and a store instruction corresponding to the selected entry; and the dependency predictor circuit configured to, in response to the dependency identifier circuit determining that no entries of the store instruction queue store the load physical register number and the load immediate value:

determine whether a prior occurrence of a read-after-write (RAW) hazard occurred as a result of out-of-order execution of the first store instruction and the load instruction; and responsive to determining that a prior occurrence of a RAW hazard occurred, establish a dependency between the first store instruction and the load instruction.

2. The processor device of claim 1, wherein the dependency identifier circuit is further configured to:

determine that execution of the first store instruction has been initiated by the instruction processing circuit; and responsive to determining that execution of the first store instruction has been initiated, invalidate the entry of the store instruction queue corresponding to the first store instruction.

3. The processor device of claim 1, wherein the age indicator comprises one of a reorder buffer index of the first store instruction and a store unit identifier of the first store instruction.

4. The processor device of claim 1, wherein the dependency identifier circuit is further configured to:

determine that a pipeline flush has been initiated by the instruction processing circuit; and responsive to determining that the pipeline flush has been initiated, selectively invalidate a second one or more entries of the store instruction queue based on corresponding one or more age indicators of the second one or more entries.

5. The processor device of claim 1, wherein the dependency predictor circuit is configured to operate in parallel with the dependency identifier circuit.

6. The processor device of claim 1, wherein the dependency identifier circuit is configured to determine whether the first one or more entries of the store instruction queue store the load physical register number and the load immediate value in response to the dependency predictor circuit determining that no prior occurrence of a RAW hazard occurred as a result of out-of-order execution of the first store instruction and the load instruction.

7. The processor device of claim 1, integrated into a device selected from the group consisting of: a set top box;

an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

8. A method for performing "cold" memory dependency identification in processor devices, the method comprising:

detecting, by a dependency identifier circuit of a processor device, a first store instruction in a front end of an instruction processing circuit of the processor device, wherein the first store instruction comprises:

a single store address register number mapped to a store physical register number; and a store immediate value;

writing, by the dependency identifier circuit, the store physical register number, the store immediate value, and an age indicator in an entry of a plurality of entries of a store instruction queue;

subsequently detecting, by the dependency identifier circuit, a first load instruction in the front end of the instruction processing circuit, wherein the first load instruction comprises:

a first single load address register number mapped to a first load physical register number; and a first load immediate value;

determining, by the dependency identifier circuit, that a first one or more entries of the store instruction queue store the first load physical register number and the first load immediate value;

responsive to determining that the first one or more entries of the store instruction queue store the first load physical register number and the first load immediate value:

selecting, by the dependency identifier circuit, an entry of the first one or more entries; and establishing, by the dependency identifier circuit, a dependency between the first load instruction and a store instruction corresponding to the selected entry;

detecting, by the dependency identifier circuit, a second load instruction in the front end of the instruction processing circuit, wherein the second load instruction comprises:

a second load address register number corresponding to a second load physical register number; and a second load immediate value; and determining, by the dependency identifier circuit, that no entries of the store instruction queue store the second load physical register number and the second load immediate value; and responsive to the dependency identifier circuit determining that no entries of the store instruction queue store the second load physical register number and the second load immediate value:

determining, by a dependency predictor circuit of the processor device, that a prior occurrence of a read-after-write (RAW) hazard occurred as a result of out-of-order execution of a second store instruction and a second load instruction; and responsive to determining that the prior occurrence of the RAW hazard occurred, establishing, by the dependency predictor circuit, a dependency between the second store instruction and the second load instruction.

9. The method of claim 8, further comprising:

determining, by the dependency identifier circuit, that execution of the first store instruction has been initiated by the instruction processing circuit; and responsive to determining that execution of the first store instruction has been initiated, invalidating, by the dependency identifier circuit, the entry of the store instruction queue corresponding to the first store instruction.

10. The method of claim 8, wherein the age indicator comprises one of a reorder buffer index of the first store instruction and a first store unit identifier of the first store instruction.

11. The method of claim 8, further comprising:

determining, by the dependency identifier circuit, that a pipeline flush has been initiated by the instruction processing circuit; and responsive to determining that the pipeline flush has been initiated, selectively invalidating, by the dependency identifier circuit, a second one or more entries of the store instruction queue based on corresponding one or more age indicators of the second one or more entries.

12. The method of claim 8, wherein the dependency predictor circuit is configured to operate in parallel with the dependency identifier circuit.

13. The method of claim 8, further comprising, determining, by the dependency predictor circuit, that no prior occurrence of a RAW hazard occurred as a result of out-of-order execution of the first store instruction and the first load instruction;

wherein the dependency identifier circuit determining that the first one or more entries of the store instruction queue store the first load physical register number and the first load immediate value is responsive to the dependency predictor circuit determining that no prior occurrence of a RAW hazard occurred as a result of out-of-order execution of the first store instruction and the first load instruction.

14. A non-transitory computer-readable medium, having stored thereon computer-executable instructions that, when executed by a processor device, cause a dependency identifier circuit of the processor device to:

detect a first store instruction in a front end of an instruction processing circuit of the processor device, wherein the first store instruction comprises:

a single store address register number mapped to a store physical register number; and a store immediate value;

write the store physical register number, the store immediate value, and an age indicator in an entry of a plurality of entries of a store instruction queue;

subsequently detect a load instruction in the front end of the instruction processing circuit, wherein the load instruction comprises:

a single load address register number mapped to a load physical register number; and a load immediate value;

determine whether a first one or more entries of the store instruction queue store the load physical register number and the load immediate value;

responsive to determining that the first one or more entries of the store instruction queue store the load physical register number and the load immediate value:

select an entry of the first one or more entries, based on corresponding one or more age indicators of the first one or more entries; and establish a dependency between the load instruction and a store instruction corresponding to the selected entry; and responsive to determining that no entries of the store instruction queue store the load physical register number and the load immediate value, cause a dependency predictor circuit of the processor device to:

determine whether a prior occurrence of a read-after-write (RAW) hazard occurred as a result of out-of-order execution of the first store instruction and the load instruction; and responsive to determining that the prior occurrence of the RAW hazard occurred, establish a dependency between the first store instruction and the load instruction.

15. The non-transitory computer-readable medium of claim 14, wherein the computer-executable instructions further cause the dependency identifier circuit of the processor device to:

determine that execution of the first store instruction has been initiated by the instruction processing circuit; and responsive to determining that execution of the first store instruction has been initiated, invalidate the entry of the store instruction queue corresponding to the first store instruction.

16. The non-transitory computer-readable medium of claim 14, wherein the age indicator comprises one of a reorder buffer index of the first store instruction and a store unit identifier of the first store instruction.

17. The non-transitory computer-readable medium of claim 14, wherein the computer-executable instructions further cause the dependency identifier circuit of the processor device to:

determine that a pipeline flush has been initiated by the instruction processing circuit; and responsive to determining that the pipeline flush has been initiated, selectively invalidate a second one or more entries of the store instruction queue based on corresponding one or more age indicators of the second one or more entries.

18. The non-transitory computer-readable medium of claim 14, wherein the computer-executable instructions cause the dependency predictor circuit to operate in parallel with the dependency identifier circuit.

19. The non-transitory computer-readable medium of claim 14, wherein the computer-executable instructions cause the dependency identifier circuit to determine whether the first one or more entries of the store instruction queue store the load physical register number and the load immediate value in response to the dependency predictor circuit determining that no prior occurrence of a RAW hazard occurred as a result of out-of-order execution of the first store instruction and the load instruction.

* * * * *